Aug. 6, 1957 S. S. MATTHES 2,802,072
TROLLEY INTERSECTION AND SYSTEM
Filed Aug. 30, 1952. 5 Sheets-Sheet 1

INVENTOR.
Samuel S. Matthes
BY
ATTORNEY

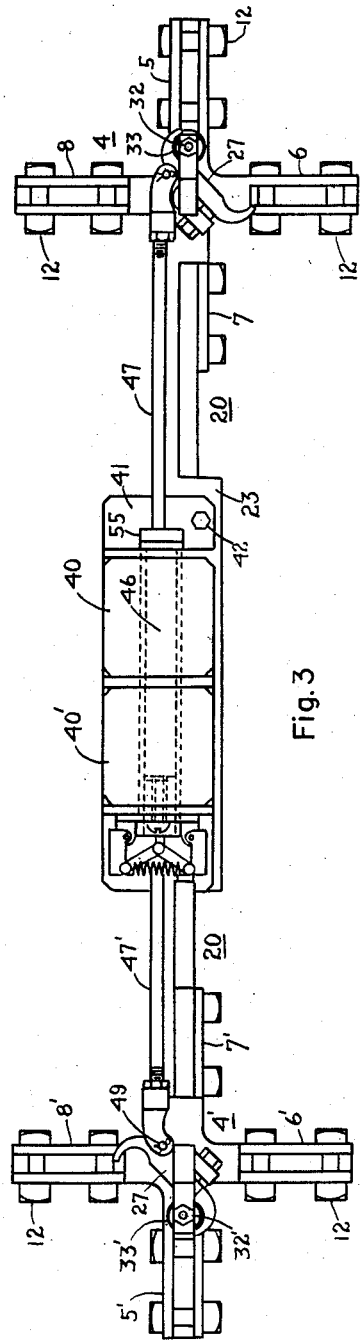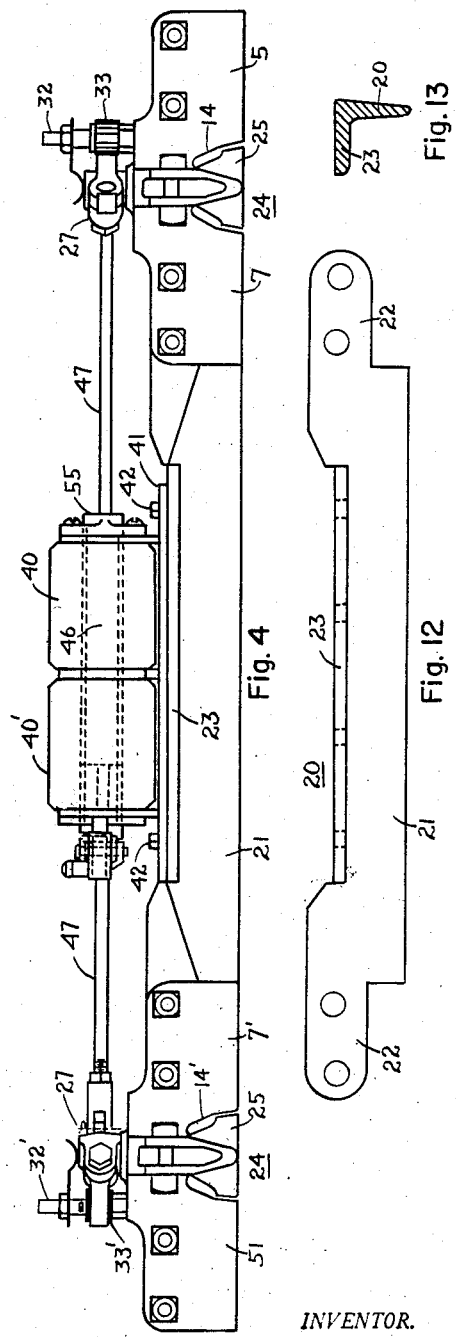

Aug. 6, 1957  S. S. MATTHES  2,802,072
TROLLEY INTERSECTION AND SYSTEM
Filed Aug. 30, 1952  5 Sheets-Sheet 4

INVENTOR.
Samuel S. Matthes
BY
ATTORNEY

Aug. 6, 1957 S. S. MATTHES 2,802,072
TROLLEY INTERSECTION AND SYSTEM
Filed Aug. 30, 1952 5 Sheets-Sheet 5
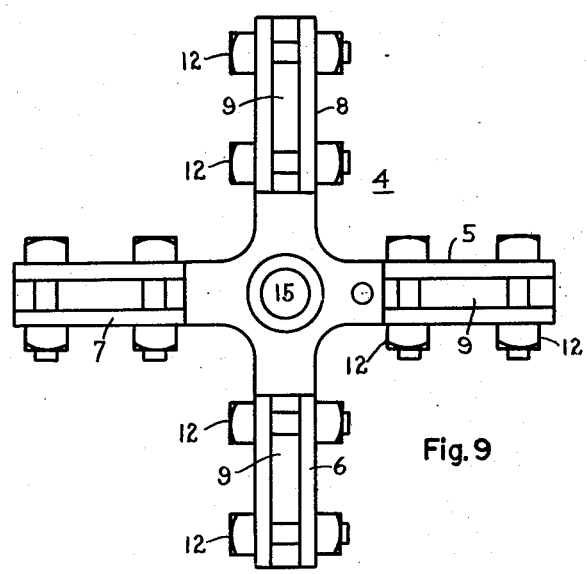
Fig. 9
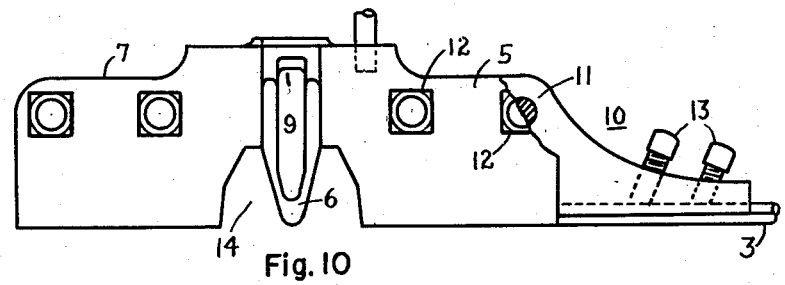
Fig. 10
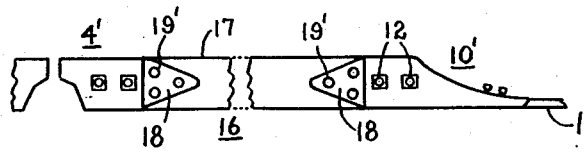
Fig. 11
INVENTOR.
Samuel S. Matthes
BY
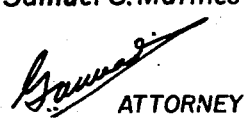
ATTORNEY United States Patent Office 2,802,072
Patented Aug. 6, 1957

2,802,072

TROLLEY INTERSECTION AND SYSTEM

Samuel S. Matthes, Mansfield, Ohio, assignor to The Ohio Brass Company, Mansfield, Ohio, a corporation of New Jersey Application August 30, 1952, Serial No. 307,211

5 Claims. (Cl. 191—37)

This invention relates to overhead trolley systems and has particular reference to crossings therefor such as where one or more lines cross one or more other lines and where the lines may be of opposite potentials.

Where one trolley crosses another trolley such as in the case of street car systems, there is no complication even when it is necessary to insulate the trolleys from each other. In street car systems the trolley wires are of the same potential, namely positive, and the track is the negative.

With the advent of the trolley bus the problem is somewhat more involved as here there will be two trolley wires for the bus system, a positive and a negative which may be crossed by one or two trolley wires of a street car system, each trolley wire being of positive polarity.

It is desirable in all overhead systems, especially at crossing points, to provide as smooth and uninterrupted travel for the current collector as possible. This, however, has not been the case up to now in the case of crossing devices, since at the point of crossing the path of travel is broken or made discontinuous mechanically but not electrically. This is very apt to cause a dewirement of the current collector and has in a number of cases resulted in considerable damage to both the vehicle and the overhead system. Particularly, such arrangements have tended to limit the speed of trolley vehicles and have militated against a general increase in operating speeds.

The particular object of this invention is to provide a crossing of the type referred to above and to provide it with means for providing a continuous path of travel for the current collector at the point of crossing of the trolley wires.

Another object of this invention is to arrange it so that the path of travel will be automatically completed upon the vehicle approaching the point of crossing.

The objects of this invention are attained by the new and useful construction, combination and relation of the parts illustrated in the accompanying drawings and the description which follows.

In the drawings—

Fig. 3 is an enlarged top view of the operating portion of Figs. 1 and 2.

Fig. 4 is a side view of Fig. 3.

Fig. 9 is a top view of the central crossing member.

Fig. 10 is a side view in partial section of Fig. 9, but includes a trolley wire tip projecting from one arm only of the central crossing member.

Fig. 11 is an enlarged side view of the insulated end-portions of Figs. 1 and 2.

Figs. 12 and 13 show a side view and an end view respectively of the live connecting or spacer member of Figs. 1 and 2.

Wherever possible like characters refer to like parts in all figures.

Figure 1:
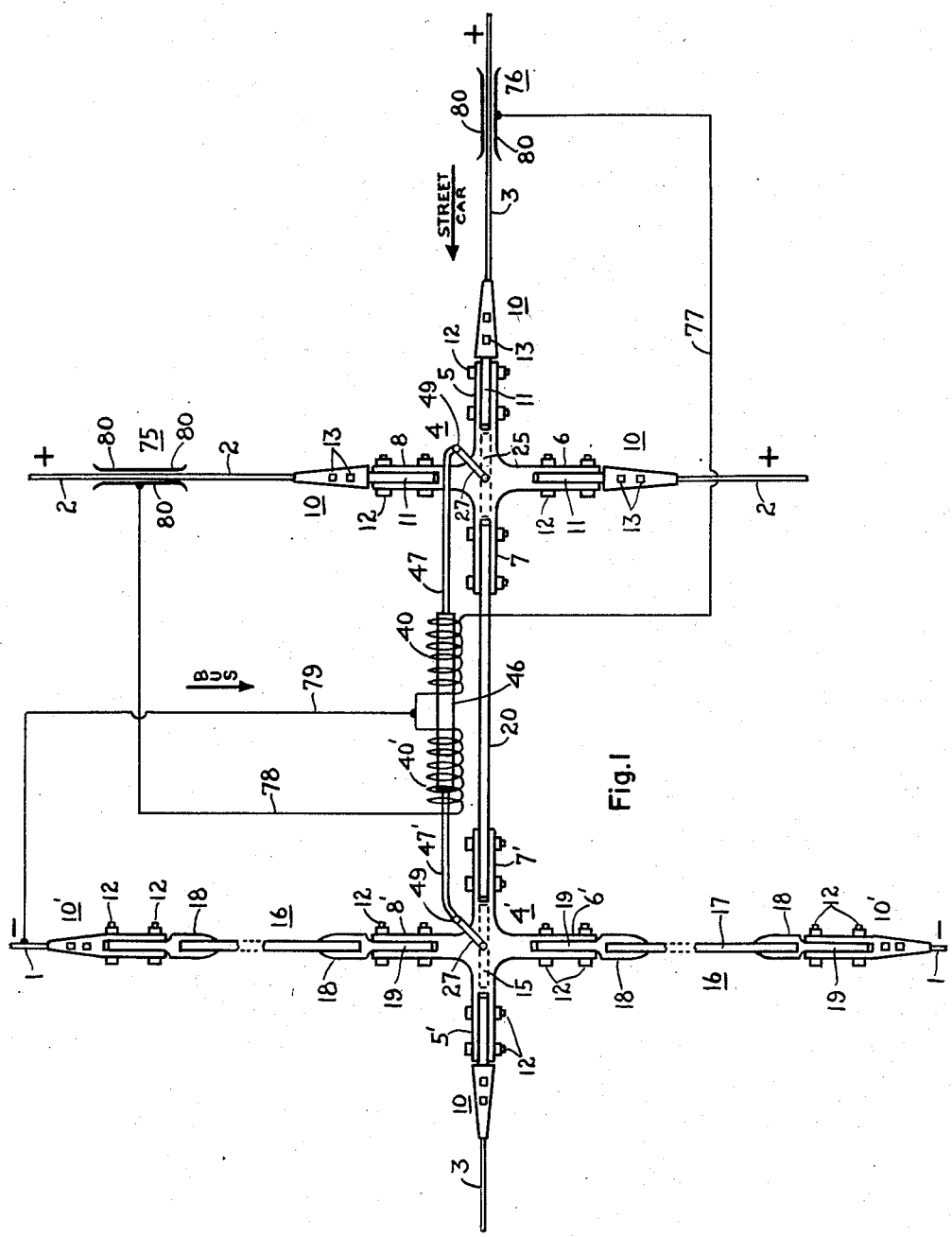
Fig. 1 is a top view schematically illustrating one form of this invention showing the path for the current collector continuous for one direction of travel.
Figure 2:
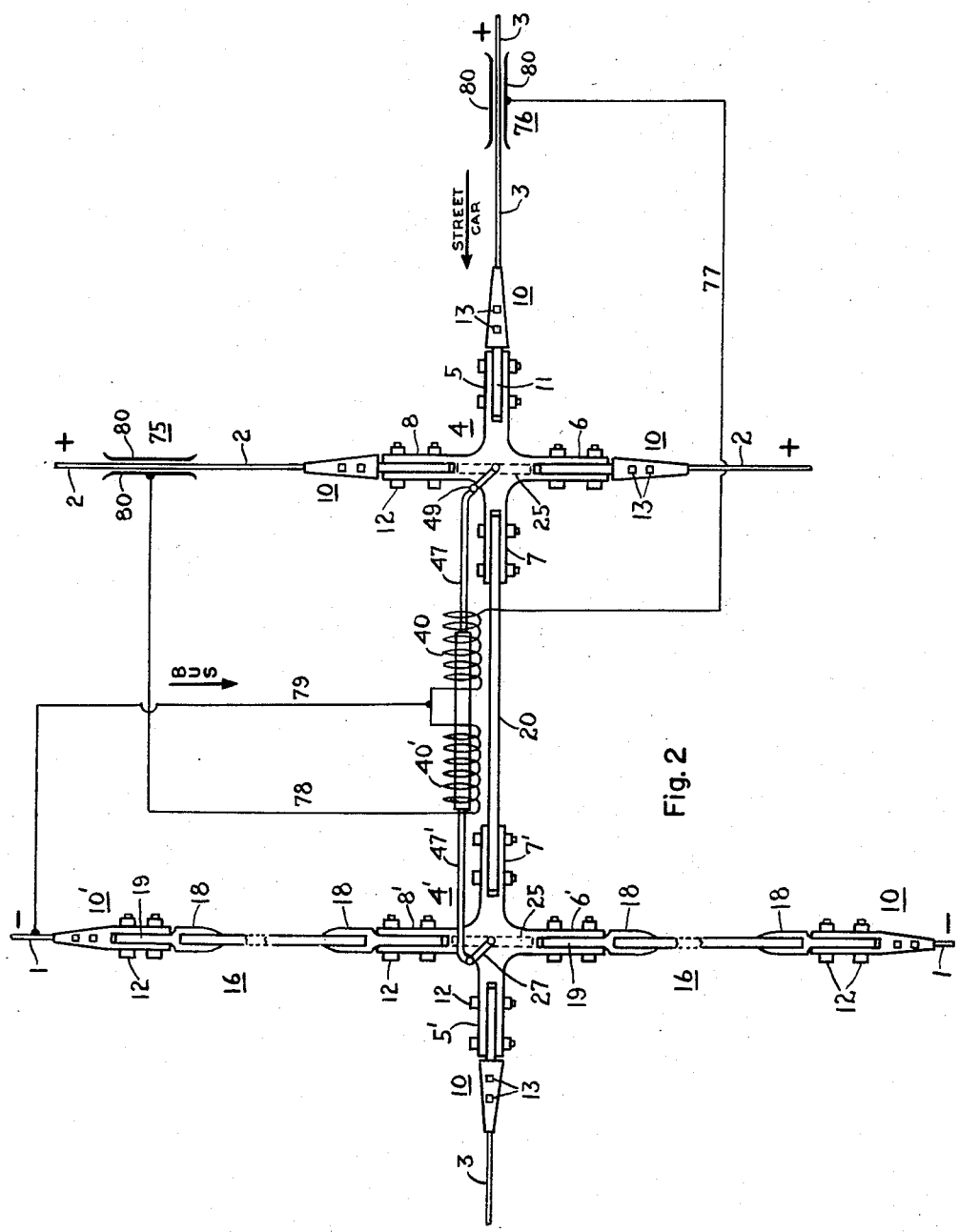
Fig. 2 is a similar view to Fig. 1, but showing the path of travel for the current collectors continuous for the other direction.

Figs. 1 and 2 disclose schematically two positions respectively of the guide or track member for a crossing in which two trolley coach wires 1 and 2 are crossed by a street car trolley wire 3.

The trolley wire 1 is negative and the trolley wires 2 and 3 are positive; hence, it is not necessary to insulate 2 and 3 from each other unless there is a special reason, as where they represent two systems of differently owned companies or for some current distribution reason, etc.

In the intersection of the two positive trolley wires there is employed a central crossing member 4 of metal which has four arms 5, 6, 7 and 8. Each arm has a longitudinal slot 9 (Fig. 9) to receive connecting fittings. Arms 5, 6 and 8 are each provided with a trolley wire tip 10 which has a tongue 11 which fits the slot 9.

The tips and arms are held in secured relation by the bolts 12, two per arm. The trolley wire is secured in position by set screws 13 (Fig. 10).

The center crossing member 4 is provided with a central opening 14 (Fig. 4) to which the arms extend, and an opening 15 extends from the opening 14 to the top surface of the member 4.

A trolley wire tip very similar to that described above is shown in U. S. Patent 2,053,965 and the right hand end of Fig. 10.

The construction and relation of the tips 10 to the arms 5, 6 and 8 are such that there is a smooth and unbroken track from the trolley wires to the associated arm (Fig. 10).

At the other end of the device where the negative trolley bus wire 1 crosses the street car wire 3, it is necessary to provide insulation to maintain the two wires electrically separated.

Here again is employed a central crossing member 4' of metal which is a duplicate of member 4. Also there is employed trolley wire tips 10' for all intent and purpose the same as the tip 10 shown in Fig. 10 except the two tips 10' are provided with a groove in place of the tongue 11. The tip 10 receiving the wire 3 is a duplicate of the tip of Fig. 10 and enters the groove of the arm 5'.

Interposed between the tips 10' and the central member 4' is an insulating spacer 16 which insulates the negative wire 1 from the positive wire 3.

The insulating spacer 16 (Fig. 11) is provided with an elongated insulating member 17 with a casting 18 at each end. The end castings 18 are each provided with a groove to receive the end of the insulating member 17 and a tongue 19 to enter the slot of the tips 10' and of the arms 6' and 8' of the member 4'.

The insulating member 17 and end members are secured together by the screws 19' and the lower edges of the insulating member 17 and of the tips 10' and central member 4' are in true alignment.

The central crossing members 4 and 4' are connected together by a metal spacer bar 20 (Fig. 12) which has the central track or guide 21 and the end members or tongues 22 to enter the slots in the inner or oppositely disposed arms 7 and 7' of the central members 4 and 4'.

The lower edge of the spacer 20 is in alignment with the lower edge of the arms 7 and 7' to give a smooth passage for the current collector (Fig. 4).

The portion 21 of the spacer 20 has a projecting shelf or ledge 23 used as a means for supporting the operating coils.

As thus far described, the wires of opposite polarity are insulated from each other and the several members have their lower or running edges aligned and abutting to provide a smooth track or guide for the current collector, except the openings 14 and 14' between the arms of the central members 4 and 4' form gaps in the track or guide.

Figure 7:
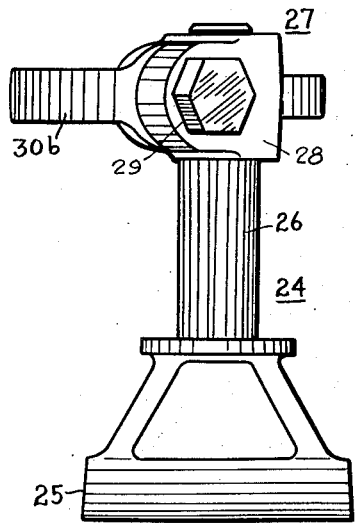
Fig. 7 is an enlarged side view of the rotatable bridging member and operating lever therefor at the point of crossing of two lines (left hand Fig. 3).
Figure 8:
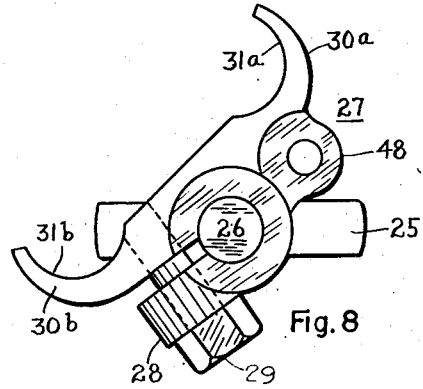
Fig. 8 is a top view of Fig. 7.

To correct this, a movable bridge member 24 is provided (Fig. 7) shown in dotted lines in one position in Fig. 1 and in its other position in Fig. 2 whereby the gap between the several arms is eliminated as required (Fig. 4). The bridging member 24 is the same construction for both the members 4 and 4'.

The bridging member 24 comprises the bridge portion 25 and the operating stem 26. The member 24 is mounted to rotate such that the bridging portion 25 will span or bridge the inner space between the longitudinally opposite arms of each central member 4 and 4' as for instance to span arms 5 and 7, 6 and 8, 5' and 7' also 6' and 8' as occasion requires.

The stem portion 26 is rotatably mounted in the central opening 15 and 15' of the members 4 and 4' respectively and held in place by the adjustable operating lever member 27 which comprises a split clamp 28 and bolt 29 for securing the lever 27 to the stem 26 in adjusted position.

The member 27 is provided with projecting stop arms 30a and 30b which in turn are provided with curved contact faces 31a and 31b to engage fixed stop means 32—32' on the members 4 and 4'.

The fixed stop consists of the studs 32 and 32' each with a non-metallic resilient contact member 33 and 33' mounted on the stud in line of rotation with the arms 30a and 30b. When the bridging member 24 is rotated to one position (left end of Fig. 3) the contact face 31b of arm 30b will engage the resilient member 33' and when rotated to its other position the contact face 31a of arm 30a engages the resilient stop 33'.

The resilient material of the contact members 33 and 33' results in a practically silent operating device.

When the operating lever 27 is in the position shown with respect to either crossing 4 or 4' (Figs. 3 and 4) the bridging portion 25 will fill the gaps 14—14' between the arms 5—7 and 5'—7' thus completing the track for the current collector (dotted lines Fig. 1) and when the bridging member 24 and lever 27 are rotated 90 degrees from that shown in Figs. 3 and 4, then the gaps 14—14' between the arms 6—8 and 6'—8' will be filled (dotted lines Fig. 2) and the arm 30a of the operating levers 27 will engage the fixed stops 32 and 32' respectively.

The operating lever 27 having its opposite faces uniformly constructed, it is reversible with respect to the stem 26 and is also rotationally and longitudinally adjustable on the stem 26 and is clamped in position by the bolt 29. By reversing the upper and lower sides of the lever 27 the operating arms 47—47' act parallel to the member 20.

If desired the crossing may be constructed to service the wires crossing at another angle than 90 degrees as shown.

The section insulator 16 (Fig. 11) may be of any other suitable design and the construction of the tips 10 and 10' may differ from that shown, also the central crossings 4 and 4' may be of a different design; all of these parts are not new and applicant makes no claim therefor other than their new combination and relation and manner in which they are used and function.

In order to operate or actuate the bridging members 24 and levers 27, a pair of electrically energized coils 40 and 40' are employed and mounted on the flat metal base 41 which in turn is mounted on the shelf or flange 23 of the spacer 20 by bolts 42 (Figs. 3 and 4).

Uprights 43 are secured to the base 41 as by welding and have longitudinally aligned openings adjacent the center. The coils are positioned between the uprights and held in longitudinal position by spacer washers 44 and supported by a metal tube 45 supported at its ends.

Figure 5:
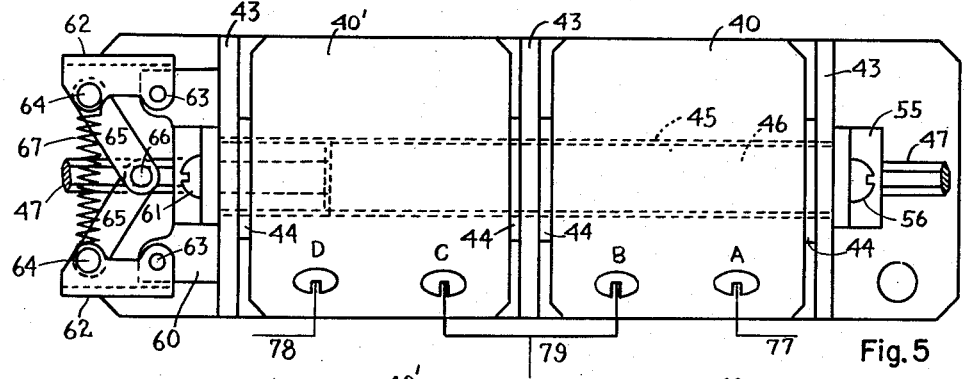
Fig. 5 is a still larger top plan view of the operating coils and latch.
Figure 6:
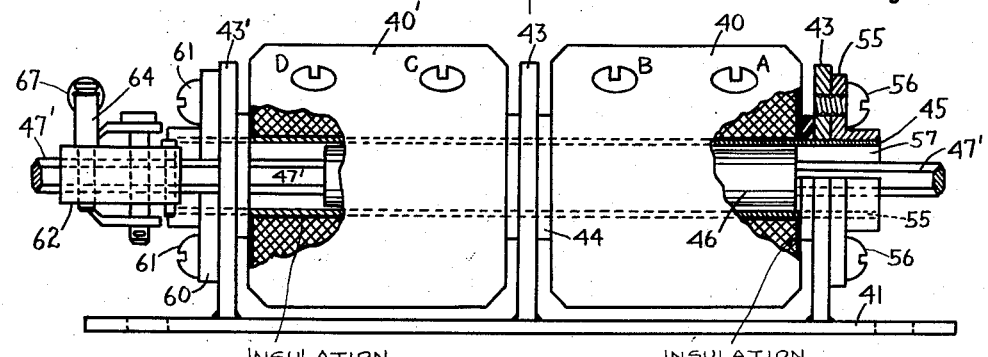
Fig. 6 is a side view in elevation of Fig. 5 in partial section.

A soft iron reciprocating core or armature 46 is positioned in the tube 45 to be actuated by the coils when energized to move to the right when coil 40 is energized (as shown in Figs. 5 and 6) and to move to the left when coil 40' is energized. When coil 40 is energized the bridging member completes the bridging of the gaps 14—14' (Fig. 1) and when the coil 40' is energized the gaps are bridged as shown in Fig. 2.

Each end of the core 46 is provided with a longitudinal connecting rod 47—47' axially aligned with the axis of the core. The distant ends of the connecting rods are pivotally attached to a lug 48 on the levers 27 by means of pins 49. The connection of the rods 47—47' to the levers 27 is adjustable by means of threads and lock nuts (Figs. 3 and 4).

One end upright 43 is provided with a detachable fitting 55 secured thereto by screws 56 and the fitting is provided with a central bore 57 in which is secured the end of the tube 45 and through which the rod 47 passes.

The other end upright 43' is provided with another detachable fitting 60 which is also provided with a bore in which the other end of the tube 45 is secured. The fitting 60 is secured to the left end upright 43' by screws 61.

The fitting 60 is also provided with over-center spring means for maintaining the actuating mechanism for the bridging means against inadvertent changes in position and consists of a pair of U-shaped links 62 with one end pivoted to the fitting 60 by pins 63.

The other ends of the links 62 are each provided with a pin 64 and interposed between each pin 64 and the rod 47' is a link 65 pivotally associated with their respective pin 64.

The links 62 are normally in parallel spaced relation and the links 65 are each longer than the perpendicular distance between the pin 64 and the rod 47' whereby, when the ends of the links 65 are each positioned and pinned to the rod 47' by a single pin 66, the links 65 will be angularly disposed to each other and to the links 62 and rod 47'.

To hold the above relation of the several parts, a spring 67 under tension has its ends secured to the pins 64, thereby placing the rods 47—47' and the core or armature 46 under longitudinal stress, the direction of the stress depending upon the direction of the links 65 relative to the rod 47'.

In Fig. 5 the setting of the holding mechanism is such that there is a constant urge for the rod 47' to move to the right, it having taken that setting when the coil 40 was energized. If the coil 40' is now energized the core will move to the left thus moving the rod 47', further tensioning the spring, and the links 65 will assume an opposite angle to the left of the spring axis. As soon as the pin 66 passes the longitudinal axis of the spring, the spring tension will force the rod 47' to continue its movement to the left and the rods 47—47' and core will be yieldingly held in that position.

The movement of the core back and forth, depending upon which coil is energized, will determine which direction the bridging member 25 takes.

In order to control the operation of the invention thus far described, it is necessary to install in combination therewith several contactors to be engaged by and energized by the current collector on a passing vehicle.

In Figs. 1 and 2, arrows indicate the direction of travel of a bus and street car. In the positive bus trolley wire 2 is placed a contactor 75 in advance of the crossing 4 and also in advance of the crossing 4; a contactor 76 is placed in the trolley wire 3.

In Figs. 5 and 6 will be seen 4 terminals A, B, C and D to which the ends of the coils 40 and 40′ are secured and to which the conductors from the various parts of applicant's system are connected.

The contactor 76 is connected to the A terminal of coil 40 by conductor 77; the contactor 75 is connected to the D terminal of coil 40′ by conductor 78; and the negative trolley wire 1 is connected to the terminals B and C of both coils by conductor 79.

The contactors may be of any suitable construction as for instance, as disclosed in U. S. Patent 2,195,734, in which the contact members 80 are permanently connected to the proper coil but disconnected from the adjacent trolley wire until a connection is made by a passing current collector.

It will be apparent that when a street car approaches the crossing and its current collector energizes contactor 76 that coil 40 will be energized, thus moving the core 46 to the right (Figs. 1 and 6) unless already in such position. In either case the bridging member 24 will be aligned with the trolley wire 3 and the associated parts, thus completing a smooth and practically uninterrupted energized path of travel for the current collector of the street car.

If now the crossing is approached by a trolley bus, when the contactor 75 is reached and energized by the current collector moving along trolley wire 2, coil 40′ will be energized and the core 46 together with rods 47 and 47′ will be moved accordingly, thereby changing the setting of the bridging member 24 and the portion 25 will be aligned with trolley wires 1 and 2 and the gap at the crossings 4 and 4′ practically closed (Fig. 2).

The above disclosure has been directed to a system in which a trolley bus line (two trolley wires) is crossed by a single street car line, but the system is also applicable to other crossing systems; as for instance, (1) a single street car trolley crossing another single street car trolley in insulated relation or (2) a trolley bus system (two trolley wires) crossing another trolley bus system (two trolley wires), or (3) a trolley bus system crossed by two street car trolley wires.

In either of the systems (1), (2) and (3) the arrangement disclosed in Figs. 1 and 2 would be used except the contactors and connectors would be changed to meet the requirements.

Certain changes may be made as a result of the foregoing disclosure, and different embodiments of the invention made which will fall within the scope and intention of the invention, therefore, it is the intention that the matter contained in the above disclosure or shown in the drawings shall be considered as illustrative and not as limitatious.

I claim as my invention:

1. Trolley crossover apparatus comprising, a pair of metallic crossing members, a plurality of spaced arms in aligned pairs projecting from each crossing member, each arm provided with means to receive a trolley wire except one arm on each crossing member, a metallic spacer attached to the last two said arms to hold the crossing members in fixed and spaced relation and maintain the members at the same potential, a rotatable bridging member mounted on each crossing member to complete a path for a current collector between two oppositely disposed arms and having a part projecting above the crossing member, the under surfaces of the arms, the spacer, and the bridging member being conformed to provide a running surface for a current collector and disposed at the same level to provide a smooth path for the current collector, a lever secured to each said projecting part to effect rotation of the bridging members to bridge the space between any two aligned arms, the lever projecting laterally from each side of the said projecting part, stop means projecting upwardly from each crossing at a point adjacent the said projecting part to stop the lever at either of two extreme positions with the bridging member aligned with either of corresponding pairs of arms, cushion means mounted on each stop means in the path of the pivoting lever to silently check the movement of the lever when the bridging member is in its proper position relative to the arms, means to actuate the bridging member comprising a pair of end to end coils mounted on the spacer and having a reciprocating armature with a connecting rod at each end and connected to the lever whereby the bridging member will be rotated to one of its positions depending upon which coil is energized, and a spring operated overcenter link having one part thereof fixed to the spacer and another part thereof operatively connected to the bridging member levers for holding the bridging members at either of the extreme positions when moved thereto by the actuating means.

2. Trolley crossover apparatus comprising two crossover members, each having four transversely disposed arms in aligned pairs with the lower portions thereof spaced apart at the center of the crossing member, and the outer portion of each arm having a groove for receiving a trolley wire tip, a bridging member disposed between the four arms and having a stem part received in an opening vertically through the crossing member, and a metallic spacer connected to the adjacent arms of the crossing members, each of the said arms, bridging members, and spacer having the under surface thereof conformed to provide a running surface for a current collector and all being disposed in the same plane to provide a smooth path for the current collector through the crossover members, an operating lever for each of the bridging members, each secured to its associated stem on the upper side of the crossover member, an electromagnetic actuator mounted on the spacer member, and means connecting the actuator to the said operating levers for simultaneously operating the bridging members to either of two alternate positions, aligned with each other, the spacer, and the associated pairs of the arms of the crossing members or in parallel with each other and aligned with the transverse pairs of arms of the two crossing members, a fixed stop operatively associated with the operating levers for limiting the movement of the bridging members to one aligned position and a second fixed stop operatively associated with the operating levers for limiting the movement of the bridging members to the remaining aligned position, and overcenter means operatively connected to the operating levers for holding the levers against one or the other of the stops when the actuator is de-energized.

3. The invention in accordance with claim 2, in which the electromagnetic actuator comprises a pair of longitudinally aligned coils and a reciprocating armature movable toward one or the other of the crossing members according to which coil is energized, the connecting means comprises two rods connecting the armature with the operating levers, and the overcenter means comprises an overcenter link having one member thereof operatively connected to one of the rods and the other member thereof fixedly supported by the spacer.

4. Trolley crossover apparatus comprising two crossover members, each having four transversely disposed arms in aligned pairs with the lower portions thereof spaced apart at the center of the crossing member, and the outer portion of each arm having a groove for receiving a trolley wire tip, a bridging member disposed between the four arms and having a stem part received in an opening vertically through the crossing member, and a metallic spacer connected to the adjacent arms of the crossing members, each of the said arms, bridging members, and spacer having the under surface thereof conformed to provide a running surface for a current collector and all being disposed in the same plane to provide a smooth path for the current collector through the crossover members, an operating lever for each of the bridging members, each secured to its associated stem on the upper side of the crossover member, an electromagnetic actuator mounted on the spacer member, and means connecting the actuator to the said operating levers for simultaneously operating the bridging members to either of two alternate positions, aligned with each other, the spacer, and the associated pairs of the arms of the crossing members or in parallel with each other and aligned with the transverse pairs of arms of the two crossing members, a fixed stop operatively associated with the operating levers for limiting the movement of the bridging members to one aligned position and a second fixed stop operatively associated with the operating levers for limiting the movement of the bridging members to the remaining aligned position, and means operatively connected to the operating levers for yieldingly holding the levers against one or the other of the stops when the actuator is de-energized.

5. The invention in accordance with claim 4, in which the electromagnetic actuator comprises a pair of longitudinally aligned coils and a reciprocating armature movable toward one or the other of the crossing members according to which coil is energized and the holding means comprises an overcenter link fixedly supported at one part thereof to the spacer and bridging members.

References Cited in the file of this patent

UNITED STATES PATENTS

| | | |
|---|---|---|
| 696,313 | Cheatem | Mar. 25, 1902 |
| 777,912 | North | Dec. 20, 1904 |
| 1,553,280 | Wright | Sept. 8, 1925 |
| 1,645,628 | Smith | Oct. 18, 1927 |
| 1,743,405 | Stolp | Jan. 14, 1930 |
| 1,768,668 | Cargo | July 1, 1930 |
| 1,962,545 | Wooley et al. | June 12, 1934 |
| 2,214,836 | Lewis | Sept. 17, 1940 |
| 2,268,962 | Richterkessing | Jan. 6, 1942 |
| 2,292,820 | Brown | Aug. 11, 1942 |
| 2,302,898 | Stolp | Nov. 24, 1942 |
| 2,473,661 | Peabody | June 21, 1949 |

FOREIGN PATENTS

| | | |
|---|---|---|
| 841,097 | France | May 10, 1939 |
| 261,532 | Switzerland | Aug. 16, 1949 |